Patented July 2, 1946

2,403,110

UNITED STATES PATENT OFFICE 2,403,110

JOINING ALUMINUM

Mike A. Miller, New Kensington, Pa., assignor to Aluminum Company of America, Pittsburgh, Pa., a corporation of Pennsylvania No Drawing. Application October 13, 1943, Serial No. 506,079

4 Claims. (Cl. 148—23)

This invention relates to improved methods of brazing aluminum and aluminum base alloys and to certain improved brazing pastes for that purpose. The term "aluminum" when used herein and in the appended claims to describe a part to be joined or brazed is defined to include not only aluminum but also alloys containing about 70 per cent, or more, by weight of that metal.

The brazing of aluminum has but recently been practiced extensively. Although the brazing of that metal may be performed in many detailed ways, the present invention is directed only to those brazing processes in which a brazing paste is used. In such processes the parts to be joined are assembled in the relationship to be established by the joining operation, a paste comprising a mixture of filler metal and flux is then placed at or near the proposed line or point of juncture and the assembly is heated to melt the filler, or brazing metal, so that it lies in molten condition at said point or line of juncture and will, on later solidification, form the desired union or connection between the assembled parts. The parts to be joined may all be made of aluminum or one or more may be made of other metal. So long as aluminum is to be joined to aluminum or to other metal the present invention has useful aspects. The temperature of brazing must, of course, lie below the melting point of the metallic articles which are to be joined.

The crux of such a brazing operation lies in the melting and coalescence of the metal particles in the brazing paste into a molten metal mass free of oxide, and in the contact of this mass with clean surfaces of the metal to be joined during the brazing step. This process is static in the sense that after the paste has been placed in its proper place near the point or line of proposed juncture of the metal parts, no physical disturbance of the body of the paste takes place except that induced by the later application of heat. Therefore, another essential element of the paste—the flux—must not only function to automatically clean the metal surfaces to be joined and the surfaces of the particles of the filler, or joining metal, but it must also first promote the coalescence of the many particles of filler metal in the paste as they melt under the applied heat. Another essential component of the paste is the vehicle and this consists of a liquid which has as its primary function the forming of the particles of metal and flux into a paste of desired consistency. The other desired functions of the vehicle are usually negative in the sense that its presence, or residues left as it is driven off or decomposed by the applied heat, will not impair or interfere with the functions of the metal and flux constituents of the paste. Therefore, the vehicle is, in a broad sense, a physical instrumentality designed to carry or bring to the operation the joint forming constituents of the paste and to preliminarily maintain those constituents in compact form at the site of the operation and to thereafter, as heat is applied, disappear without leaving behind objectionable matter such as large amounts of carbon.

The present invention has as an object the provision of an improved aluminum brazing process in which the mixture of flux and filler or joining metal is brought to the operation in particular vehicles performing, without deleterious effects, the functions above outlined. A further object of the invention is the provision of new and improved brazing pastes particularly adapted to the brazing of aluminum. A still further object is a new and improved paste characterized by improved flowing properties of the metallic constituents at the brazing temperature, and the provision of methods for making such a paste. Other and related objects will appear from the following description.

The brazing of aluminum normally requires the use of an aluminum base alloy as the brazing or filler metal. This alloy must, as is known, melt at a temperature lower than the melting temperature of the aluminum body to be joined in order that during the brazing operation only the joining or filler metal will be melted and the parts to be joined will retain their solidity against the degree of heat required to effect that result. The aluminum alloy used as the filler may thus be selected from those alloys which have a lower melting point than the aluminum bodies being joined. The selection is, therefore, somewhat restricted according to whether the aluminum body to be joined has a high melting point, (example, pure aluminum) or a lower melting point such as is possessed by aluminum base alloys. Alloys which are used as filler metal include aluminum-silicon alloys with or without minor additions of other alloying elements which tend to further lower the melting point thereof, such as zinc, cadmium or tin, etc.; aluminum-copper alloys; aluminum-copper-zinc alloys; aluminum-zinc alloys or other aluminum alloys all with or without the addition of other elements to effect lowering of the melting point or to produce other effects. In some cases it may be convenient to merely add the constituents of the proposed alloy to the brazing mixture and to thus allow the desired alloy to be formed during the brazing operation. For example, instead of adding particles of aluminum-zinc alloy to the brazing mixture particles of aluminum and of zinc may be added in proper proportions. This expedient is intended to be included when the mixture is referred to as containing an "alloy." The selection of the filler alloy may also be governed by considerations other than melting point, such as corrodibility, strength, etc., all of which are dictated by the use to which the brazed article is to be put. The selection of a particular filler metal or alloy is not, however, a part of this invention, the factors governing such selection being well known. Of importance, however, is the fact that such alloys always contain substantial proportions, at least 50 per cent by weight, of aluminum and, therefore, partake of the nature of pure aluminum in that they present on their surface, whether molten or solid, a tenacious film of oxide which, if not eliminated therefrom, prevents a successful joining of the surfaces and proper coalescense of the particles of metal in the brazing paste as such particles become molten under the application of the brazing heat.

It is the presence of this oxide on aluminum surfaces which has required, for the successful joining of aluminum, the use of fluxes composed principally of alkali metal chlorides together with smaller amounts of alkali metal fluorides. Such fluxes may, and often do, contain small amounts of alkaline earth compounds and compounds of heavy metals, but their chief characteristic is the presence of about 50 per cent or more of alkali metal chloride. For the purposes of the description of this invention and the claims directed thereto, these fluxes will be identified and defined as "alkali metal chloride fluxes." Such a flux is well known to the aluminum joining art in many specific compositions, some of which are, as is known, better suited to brazing operations than are others, but the principles of this invention apply to all except as hereinafter specifically noted. The alkali metal chloride flux used should, of course, be molten at the temperature of brazing.

The proportion of alkali metal chloride flux to filler metal best used in the brazing operation may vary according to the needs, and even the particular viewpoint, of the operator. I have found mixtures of 3 parts by weight of flux to 1 part by weight of filler metal to give the most consistent results, but mixtures of from 5 to 1 to 1 to 1 are likewise useful. The flux should be in powdered form to promote uniform mixture and good paste formation. The filler metal should be in the form of discrete particles and I prefer those of a size which will not pass 200 mesh and have obtained best results when not more than about 10 to 20 per cent of the particles of the metal powder will pass 200 mesh. Normally the particles should be in maximum size not much greater than will pass about 50 mesh. The flux and filler metal particles are thoroughly mixed together to form the brazing mixture.

The vehicle used to place the alkali metal chloride flux-filler metal mixture in paste form and to thus carry it to the operation should be non-aqueous and should volatilize or otherwise leave the paste at the brazing temperature, and should, in addition, fulfill the functions above specifically described. One phase of the present invention contemplates the use as a vehicle of certain specific liquid organics which, I have discovered, particularly fulfill the functions of a vehicle when aluminum is brazed by the use of aluminum base alloy filler metal and alkali metal chloride flux. When such vehicles are used, the brazing operation is particularly successful. In accordance with broader aspects of this invention, the vehicle should be selected from the class consisting of the glycols and glycol ethers which are liquid at 20° C. and which evaporate without carbonizing. Common examples of this class are ethylene glycol, diethylene glycol, triethylene glycol, tetraethylene glycol, dimethoxy-tetraethylene glycol, propylene glycol, dipropylene glycol, 1;3 butylene glycol, the monomethyl-, monoethyl-, diethyl-, monoisopropyl-, monobutyl-, monophenyl-, and monobenzyl ethers of ethylene glycol and the monomethyl-, monoethyl-, diethyl- and monobutyl ethers of diethylene glycol.

I have discovered, however, that when the flux contains lithium chloride the use of ethylene glycol or of di-, tri- or tetra ethylene glycol as vehicle may not be entirely satisfactory since some carbonization is produced upon heating. For this reason I do not use these vehicles, in the preferred practice of the invention, when the flux contains lithium chloride.

The amount of vehicle added to the flux-filler metal mixture to form the paste will depend upon the exact physical condition required in the paste, viscous or thin. Usually amounts of 10 to 20 per cent by weight of the total paste are best used.

While, as above mentioned, the flux-filler metal mixture may be formed by mechanically mixing these components, I have determined that a paste of superior qualities will result if the particles of brazing alloy which form a part of the paste are more or less surrounded or coated with a film of flux. When such a paste is fused in the brazing operation, the filler metal flows to the joint much more rapidly and effectively than is the case when the brazing alloy particles, as heretofore, are not coated with a flux film but are merely mixed with the flux. This rapid flowing property not only expedites the brazing operation but also results in the formation of a better and sounder joint between the articles which are being brazed. Such advantages, however, are only obtained when the alkali metal chloride flux employed is free of heavy metal compounds.

While several methods might be employed for producing the improved paste, I have developed, and prefer, the following. Alkali metal chloride flux free of heavy metal compounds and having a melting point lower than that of the brazing alloy is selected in suitable quantity and heated until molten. The molten flux bath thus obtained is then held at a temperature below the melting point of the brazing alloy and a quantity of particles of brazing alloy are placed in the bath and thoroughly mixed therewith. The resulting mixture is then cooled and solidified and the solidified mass thus formed comminuted in any convenient way, as by ball milling, to particles of desired size. The comminuted mass is then wetted to paste-like form by additions thereto of organic vehicle preferably selected from those just above described. Additions of water, other than such as occurs normally in the salts used, is preferably avoided. During the mixing operation it is, of course, necessary to avoid melting of the brazing alloy particles and, therefore, flux selected for the operation should have a lower melting point than that of the brazing alloy. The melting point of most alkali metal chloride fluxes can be lowered by the addition thereto of lithium chloride if their original melting point is too high or, from the viewpoint of practical application, too close to that of the brazing alloy.

A specific example of a brazing paste which embodies the invention and from the use of which excellent results have been obtained is the following:

22.5% by weight of alloy:
    5.0% by weight of silicon, balance aluminum ground to 200 mesh.

67.5% by weight of flux, composed of:

| | Per cent by weight |
|---|---|
| NaCl | 25 |
| KCl | 36 |
| LiCl | 20 |
| $SrCl_2$ | 6 |
| KF | 1 |
| $Na_3AlF_6$ | 12 |

10% weight of vehicle:
    Propylene glycol.

I claim:

1. In that method of joining metal parts by brazing, where at least one of the parts to be joined is aluminum, which comprises bringing a mixture of alkali metal chloride flux and filler metal consisting of aluminum base alloy to the brazing operation in the form of a paste composed of said mixture and an organic vehicle, the improvement comprising the use in said paste of a vehicle selected from the class consisting of the glycols and glycol ethers which are liquid at 20° C. and evaporate without carbonizing.

2. A powdered brazing mixture composed of an alkali metal chloride flux and aluminum base alloy and having a paste-like consistency imparted to it by the presence therein of a liquid selected from the class consisting of the glycols and glycol ethers which are liquid at 20° C. and evaporate without carbonizing.

3. The method of preparing a brazing paste composed of alkali metal chloride flux in which are dispersed particles of aluminum base alloy which consists in preparing a molten bath of an alkali metal chloride flux having a melting point lower than that of the aluminum base alloy, maintaining the molten flux bath at a temperature below the melting temperature of the alloy, mixing particles of alloy with said bath, solidifying the mixture, communiting the solidified mixture and wetting the resulting comminuted mass to paste-like form by the addition thereto of organic vehicle.

4. A brazing medium consisting of particles of alkali metal chloride flux and intermixed particles of aluminum base alloy at least partially coated with a film of said flux and a pasting agent consisting of non-aqueous organic vehicle in amount sufficient to form said medium into a paste, said brazing medium being characterized by a capacity to flow more readily at brazing temperature than a similar medium of like composition in which the alloy particles are uncoated.

MIKE A. MILLER.